(12) United States Patent
Willshee

(10) Patent No.: US 11,698,023 B2
(45) Date of Patent: Jul. 11, 2023

(54) AIRCRAFT CABIN BLOWER SYSTEM

(71) Applicant: ROLLS-ROYCE plc, London (GB)

(72) Inventor: Matthew J. Willshee, Nottingham (GB)

(73) Assignee: Rolls-Royce plc, London (GB)

( * ) Notice: Subject to any disclaimer, the term of this patent is extended or adjusted under 35 U.S.C. 154(b) by 103 days.

(21) Appl. No.: 17/245,163

(22) Filed: Apr. 30, 2021

(65) Prior Publication Data

US 2021/0362859 A1 Nov. 25, 2021

(30) Foreign Application Priority Data

May 21, 2020 (GB) ...................................... 2007576

(51) Int. Cl.

| | |
|---|---|
| *F02C 6/20* | (2006.01) |
| *B64D 13/02* | (2006.01) |
| *F02C 7/275* | (2006.01) |
| *B64D 13/06* | (2006.01) |

(Continued)

(52) U.S. Cl.
CPC ............... *F02C 6/20* (2013.01); *B64D 13/02* (2013.01); *F02C 7/275* (2013.01); *B64D 2013/0644* (2013.01); *B64D 2013/0696* (2013.01); *F05D 2220/323* (2013.01); *F05D 2260/40311* (2013.01); *F16D 41/12* (2013.01); *F16H 57/037* (2013.01)

(58) Field of Classification Search
None
See application file for complete search history.

(56) References Cited

U.S. PATENT DOCUMENTS 4,514,976 A * 5/1985 Christoff ................... F02C 6/06
60/39.15
4,900,231 A 2/1990 Kennedy
(Continued)

FOREIGN PATENT DOCUMENTS

| EP | 1270293 A2 | 1/2003 |
|---|---|---|
| EP | 2320067 A2 | 5/2011 |
| EP | 3628848 A1 | 4/2020 |

OTHER PUBLICATIONS

European search report dated Aug. 31,20201, issued in EP Patent Application No. 21169779.
(Continued)

*Primary Examiner* — Kayla Mccaffrey
(74) *Attorney, Agent, or Firm* — Shumaker & Sieffert, P.A.

(57) ABSTRACT

An aircraft cabin blower system comprises a cabin blower including a compressor configured to provide air to a cabin of the aircraft; a variable drive system configured to drive the compressor and including an electric variator and a summing gearbox; and a main transmission configured, when operating in a blower mode, to receive mechanical power from a gas turbine engine and input mechanical power to the summing gearbox in a forward direction; and configured, when operating in a starter mode, to receive mechanical power from the summing gearbox and input mechanical power to the gas turbine engine. The aircraft cabin blower system further includes a first one-way rotation device adapted to permit free rotation of the main transmission in the forward direction and to prevent rotation of the main transmission in a reverse direction opposite to the forward direction.

12 Claims, 4 Drawing Sheets

(51) Int. Cl.
*F16D 41/12* (2006.01)
*F16H 57/037* (2012.01)

(56) References Cited

U.S. PATENT DOCUMENTS

| | | | |
|---|---|---|---|
| 8,118,253 B1* | 2/2012 | Casado Abarquero | ..................... B64D 41/00 244/58 |
| 2002/0195285 A1* | 12/2002 | Egami | ................. F02N 11/0814 180/65.265 |
| 2016/0167789 A1* | 6/2016 | Knight | ................... B64D 13/02 454/71 |
| 2018/0266329 A1 | 9/2018 | Mackin | |
| 2019/0233123 A1 | 8/2019 | Sharpe et al. | |
| 2019/0233124 A1 | 8/2019 | Sharpe et al. | |
| 2019/0233125 A1 | 8/2019 | Knight et al. | |
| 2020/0102885 A1* | 4/2020 | Kupratis | ................ B64D 13/02 |

OTHER PUBLICATIONS

Great Britain search report dated Feb. 18, 2021, issued in GB Patent Application No. 2007576.8.

* cited by examiner

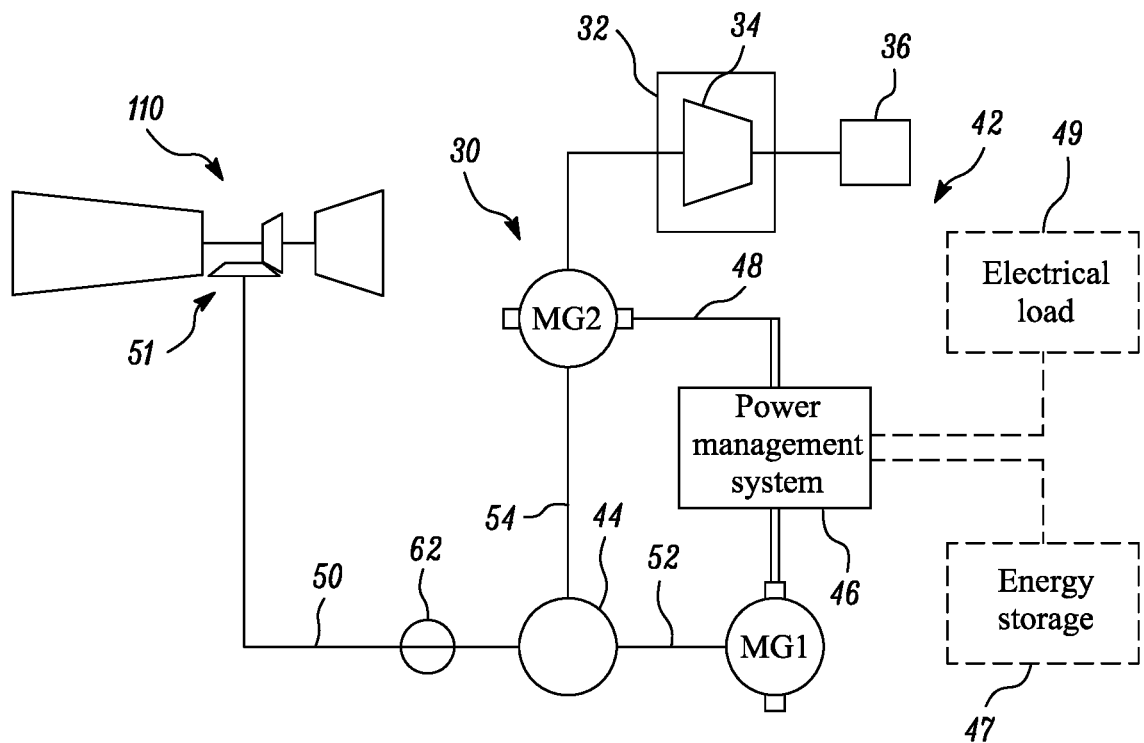
FIG. 3
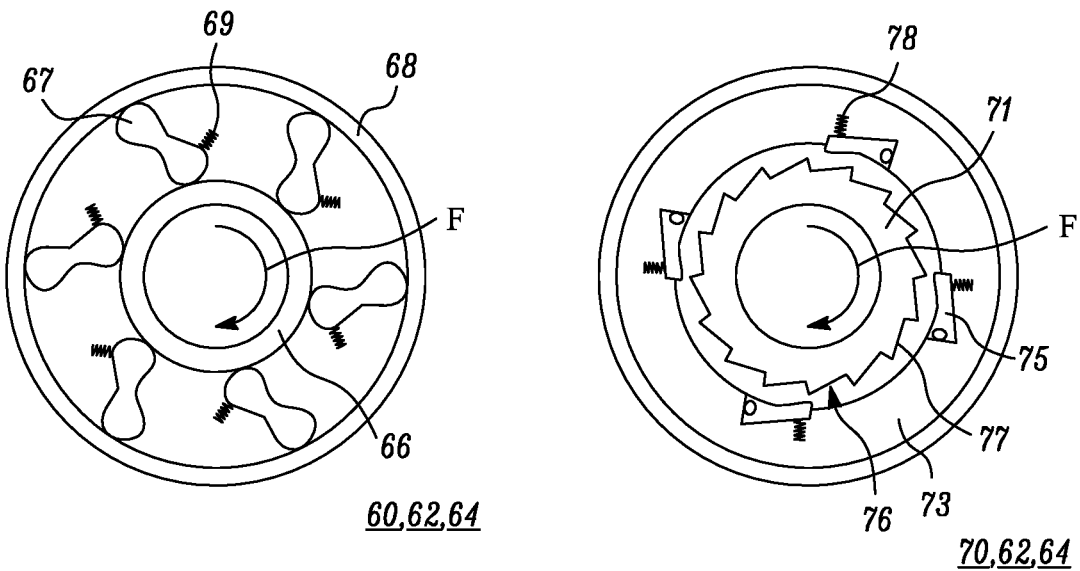
FIG. 4
FIG. 5

AIRCRAFT CABIN BLOWER SYSTEM

CROSS-REFERENCE TO RELATED APPLICATIONS

This specification is based upon and claims the benefit of priority from United Kingdom Patent Application Number 2007576.8, filed on 21 May 2020, the entire contents of which are incorporated herein by reference.

BACKGROUND

Technical Field

The present disclosure relates to cabin blower systems for aircraft, and in particular to cabin blower systems for transferring power between a gas turbine engine and a cabin blower.

Description of the Related Art

Cabin blowers are known for pressurising the cabin of an aircraft. Cabin blowers provide an airflow to cabins of aircraft at a controlled temperature and pressure. A cabin blower is typically driven by a compressor, which in turn is driven by a shaft of the gas turbine engine via an accessory gearbox. As it is not desirable for the compressor of the cabin blower to rotate at a speed determined by the particular operating point of the gas turbine at any particular moment, a gearing mechanism is normally provided between the accessory gearbox and the compressor of the cabin blower to vary the compressor speed and keep the cabin airflow and pressure within acceptable limits.

An example of a cabin blower system wherein the compressor is free to rotate at a speed that matches the needs of the aircraft, regardless of the engine core speed, is illustrated in FIG. 1 and comprises a variable drive system 100 which receives mechanical power from a gas turbine engine 101 and provide mechanical power to a compressor 102 of a cabin blower. The variable drive system 100 includes two electrical machines (MG1 and MG2) and a summing gearbox 103 configured such that altering the power flow between the two machines (with one generating power and one motoring using power from the other) by means of a power management system 104 varies the output speed of the cabin blower compressor 102. The power management system 104 may include batteries 105, and/or a platform power bus 106 to receive power from an external power source. The illustrated cabin blower system has the potential to operate in an electrical-only mode, or in other words when the gas turbine engine is off, thereby reducing fuel consumption and limiting emissions, but features a major drawback: the power capacity provided by the two electrical machines is limited as one of the two electrical machines is constrained to rotate with the gas turbine (which, by definition is not rotating in the electrical-only mode). Notably, since the concept of the cabin blower is to maximise efficiency and minimise weight of the electrical machines, the remaining electrical machine will have a power rating below that of the blower compressor, thereby limiting the capability of the motor in this mode.

There is therefore a need for a cabin blower system with improved electrical capability.

SUMMARY

According to a first aspect, there is provided an aircraft cabin blower system comprising:
a cabin blower including a compressor configured to provide air to a cabin of the aircraft;
a variable drive system configured to drive the compressor and including an electric variator and a summing gearbox; and
a main transmission configured, when operating in a blower mode, to receive mechanical power from a gas turbine engine and input mechanical power to the summing gearbox in a forward direction; and configured, when operating in a starter mode, to receive mechanical power from the summing gearbox and input mechanical power to the gas turbine engine;
characterised in that the aircraft cabin blower system further includes a first one-way rotation device adapted to permit free rotation of the main transmission in the forward direction and to prevent rotation of the main transmission in a reverse direction opposite to the forward direction.

The gas turbine engine may be a main gas turbine engine of the aircraft. That is, it may be one of one or more gas turbine engines arranged to provide propulsive thrust for the aircraft. The gas turbine engine may be configured for attachment to a wing of the aircraft.

The electric variator may comprise a first electrical machine, a second electrical machine, and a power management system, the first and the second electrical machines being independently configured to work as electric motors and/or as power generators.

The second electric machine may be connected to the compressor of the cabin blower.

The first electrical machine and the second electrical machine may be connected to the power management system.

The first electrical machine may be connected to the summing gearbox through a first auxiliary transmission, and the second electrical machine may be connected to the summing gearbox through a second auxiliary transmission.

The first one-way rotation device may include a freewheel with a ratchet device comprising sprung pawls. Alternatively, the first one-way rotation devices may include a sprag clutch.

The first one-way rotation device may be arranged such that centrifugal forces move the sprung pawls or sprags into an unlocked position when the main transmission rotates in the forward direction.

The first one-way rotation device may apply a countertorque on to the summing gearbox when the gas turbine engine is not running and a torque in the reverse direction is applied.

The aircraft cabin blower system may further comprise a second one-way rotation device adapted to permit free rotation of the second auxiliary transmission in the forward direction and to prevent rotation of the second auxiliary transmission in the reverse direction opposite to the forward direction.

The second one-way rotation device may include a freewheel with a ratchet device comprising sprung pawls, or a sprag clutch.

The second one-way rotation device may be arranged such that centrifugal forces move the sprung pawls or sprags into an unlocked position when the main transmission rotates in the forward direction.

The summing gearbox may be an epicyclic gearbox, or a differential gear.

The aircraft cabin blower system of the first aspect may be used to drive the cabin blower purely electrically by means of the electric variator without running the gas turbine engine.

The aircraft cabin blower system of the first aspect according to the embodiment comprising two one-way rotation devices may be used to start the gas turbine engine purely electrically by means of the electric variator without running the gas turbine engine.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which:

FIG. 3 is a block diagram of a cabin blower system comprising a first one-way rotation device;

FIG. 4 is a schematic view of a one-way rotation device according to an embodiment of the disclosure;

FIG. 5 is a schematic view of a one-way rotation device according to another embodiment of the disclosure;

DETAILED DESCRIPTION

Figure 2:
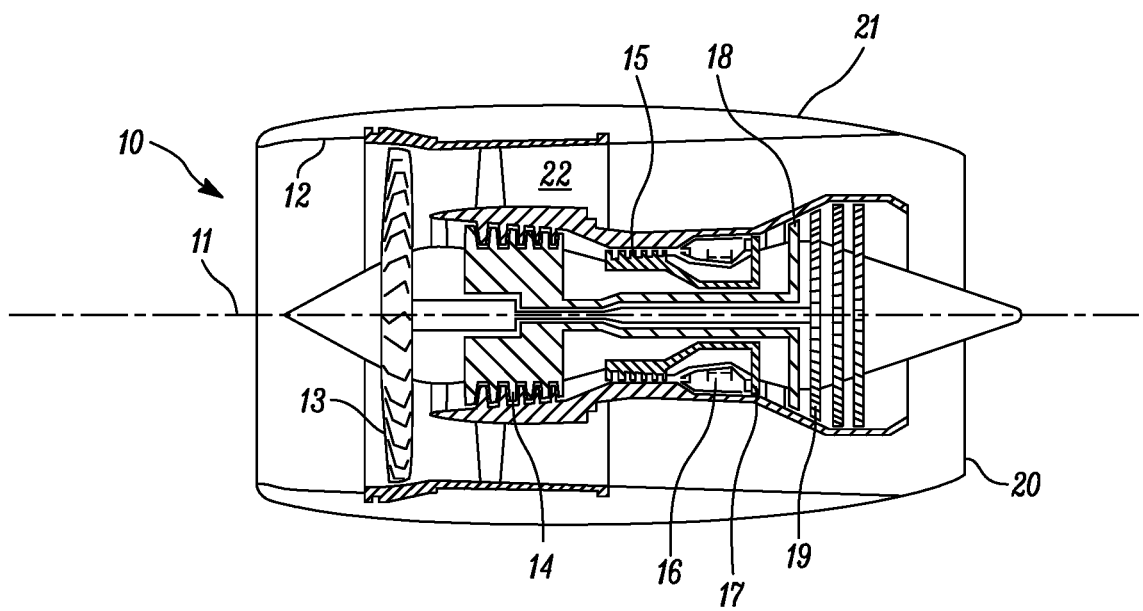
FIG. 2 is a sectional side view of a gas turbine engine.

With reference to FIG. 2, a gas turbine engine is generally indicated at 10, having a principal and rotational axis 11. The engine 10 comprises a propulsive fan 13 and a core including, in axial flow series, an intermediate pressure compressor 14, a high-pressure compressor 15, combustion equipment 16, a high-pressure turbine 17, an intermediate pressure turbine 18, a low-pressure turbine 19. A nacelle 21 generally surrounds the engine 10 and defines both an air intake 12 and a core exhaust nozzle 20.

In the present disclosure, upstream and downstream are with respect to the air flow through the compressor. Moreover, front and rear is with respect to the gas turbine engine, i.e. the fan being in the front and the turbine being in the rear of the engine.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The first airflow is accelerated and compressed by the low pressure compressor 14 and directed into the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. For example, the gas turbine engine may comprise a fan, two compressors and two turbines. Further the engine may comprise a gearbox provided in the drive train from a turbine to a compressor and/or fan. For example, the fan may be attached to and driven by the low pressure turbine via a power gearbox. The power gearbox may be an epicyclic gearbox with a star or planetary configuration.

Note that the terms "low pressure turbine" and "low pressure compressor" as used herein may be taken to mean the lowest pressure turbine stages and lowest pressure compressor stages (i.e. not including the fan 13) respectively and/or the turbine and compressor stages that are connected together by the interconnecting shaft with the lowest rotational speed in the engine (i.e. not including the gearbox output shaft that drives the fan 13). In some literature, the "low pressure turbine" and "low pressure compressor" referred to herein may alternatively be known as the "intermediate pressure turbine" and "intermediate pressure compressor". Where such alternative nomenclature is used, the fan 13 may be referred to as a first, or lowest pressure, compression stage.

Figure 1:
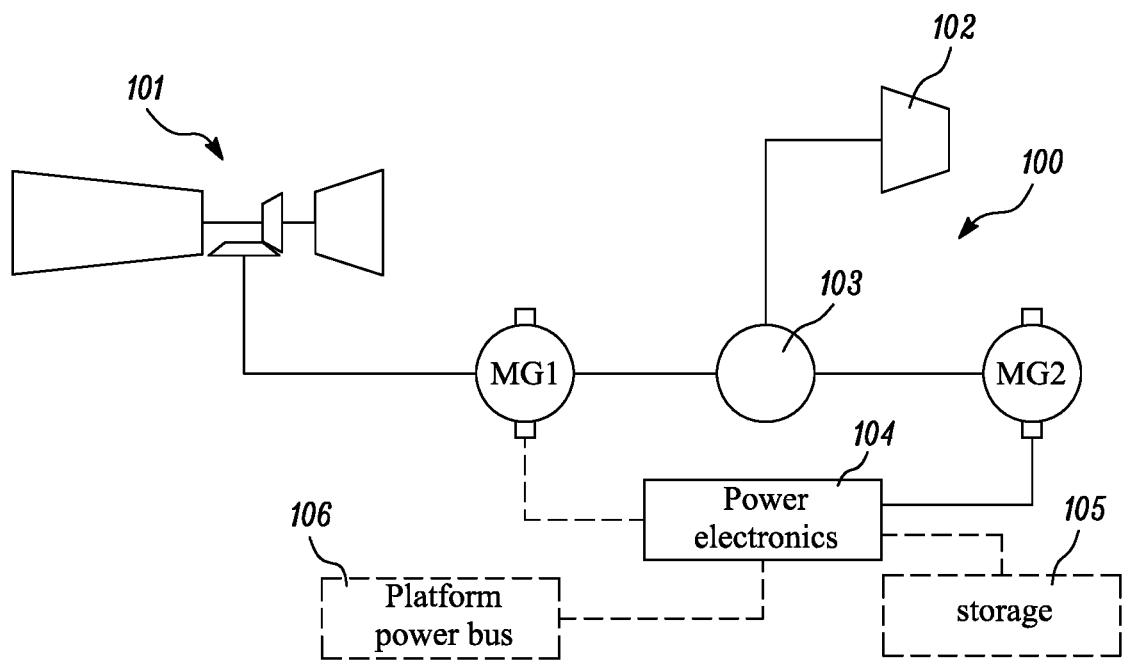
FIG. 1 is a block diagram of a known cabin blower system.

The geometry of the gas turbine engine 10, and components thereof, is defined by a conventional axis system, comprising an axial direction (which is aligned with the main and rotational axis 11), a radial direction (in the bottom-to-top direction in FIG. 1), and a circumferential direction (perpendicular to the page in the FIG. 1 view). The axial, radial and circumferential directions are mutually perpendicular.

FIG. 3 illustrates a first embodiment of cabin blower system 30 for an aircraft according to the disclosure.

The cabin blower system 30 comprises a cabin blower 32 including a compressor 34 configured to provide controlled air to a cabin 36 of the aircraft.

The cabin blower system 30 further includes a variable drive system 40 connected to the core of a gas turbine engine 110 through a main transmission 50. The main transmission 50 may be a mechanical transmission.

The gas turbine engine 110 may be of the type of the gas turbine engine 10 illustrated with reference to FIG. 2, or may be different, as explained before, for example in terms of number of compressors, turbines, interconnecting shafts, and it may, or may not, comprise a power gearbox.

The variable drive system 40 is configured to drive the compressor 34 at a speed independent from, within certain limits, the engine core rotational speed.

The variable drive system 40 comprises an electric variator 42 and a summing gearbox 44.

In an embodiment, the main transmission 50 receives mechanical power from an accessory gearbox 51 of the gas turbine engine 110 and input mechanical power to the summing gearbox 44. In normal operation, where the gas turbine engine 110 drives the cabin blower compressor 34 through the electrical variator 42 and the summing gearbox 44, the main transmission 50 rotates in a forward direction.

The summing gearbox 44 further includes an additional mechanical input and an output (or summing output) that drives the cabin blower compressor 34, as explained in detail hereinafter.

In general, the gas turbine engine, which the present disclosure may apply, may be a bypass turbofan comprising multiple shafts, each of which may provide mechanical power to the main transmission 50, either directly or through an accessory gearbox.

The electric variator 42 comprises a first electrical machine MG1, a second electrical machine, and a power management system 46.

The first electrical machine MG1 is configured to work as an electric motor or as a power generator.

The second electrical machine MG2 is configured to work as an electric motor or as a power generator.

The first and second electrical machines MG1, MG2 are configured to independently work as electric motor or power generator.

The power management system 46 interconnects the first electrical machine MG1 and second electrical machine MG2 through an electrical transmission 48 (illustrated in double line in FIG. 3) and controls whether each of the first and second electrical machines MG1, MG2 work as electric motor or power generator.

In an embodiment, the power management system 46 can include electric energy storage 47, in the form for example of one or more batteries, capacitors or similar. The power management system 46 can further output electrical power to an external electrical load 49, such as for example aircraft control surface actuators, anti-ice heating, control systems/avionics, galley power.

The first electrical machine MG1 is connected to the summing gearbox 44 through a first auxiliary transmission 52.

The second electrical machine MG2 is connected to the summing gearbox 44 through a second auxiliary transmission 54.

The first and second auxiliary transmissions 52, 54 are mechanical transmissions.

For example, a mechanical transmission may be anything from a simple shaft up to a complex gearbox.

In normal operation, where the gas turbine engine 110 drives the cabin blower compressor 34 through the electrical variator 42 and the summing gearbox 44, the main transmission 50 and second auxiliary transmissions 54 rotates in a forward direction.

The first auxiliary transmission 52 may rotate in the forward direction, or in a reverse (backward) direction, depending on a speed ratio desired between the gas turbine engine 110 and the cabin blower 32.

The summing gearbox 44 features two inputs (the main transmission 50 and the first auxiliary transmission 52) and one output (the second auxiliary transmission 54).

The summing gearbox can be simply understood as a gearbox that delivers a transfer function of the form $\Omega_{out}=K_1\Omega_1+K_2\Omega_2$ where $\Omega_{out}$ is the rotational speed of an output shaft, $\Omega_1$, and $\Omega_2$ are the rotational speeds of two input shafts and $K_1$ and $K_2$ are some fixed constants.

In the embodiment of FIG. 3, for the summing gearbox 44 the following speed relationship applies:

$$\Omega_{load}=K_1\Omega_{GT}+K_2\Omega_{MG1}, \quad\quad 1)$$

wherein $\Omega_{load}$ is the rotational speed of an output shaft of the second auxiliary transmission 54 connected to the compressor 34 of the cabin blower 32, $\Omega_{GT}$ is the rotational speed of the main transmission 50, $\Omega_{MG1}$ is the rotational speed of the first auxiliary transmission 52, and $K_1$ and $K_2$ are some fixed constants.

We will define power at the summing gearbox 44 as positive when an item attached to the relevant input is putting mechanical power in to the system and negative when it is drawing mechanical power from the system. This also gives a sign convention for torque. Power flow is positive when torque and speed have the same sign, negative when they oppose.

Neglecting losses and given the above speed relationship 1) at the summing gearbox 44, the following torque relationship applies:

$$-\frac{T_{GT}}{K_1} = (T_{LOAD} + T_{MG2}) = -\frac{T_{MG1}}{K_2}, \quad\quad 2)$$

wherein $T_{GT}$ is the torque provided by the main transmission 50, $T_{LOAD}$ is the torque applied to the cabin blower compressor 34, $T_{MG1}$ is the torque applied by the first electrical machine MG1, and $T_{MG2}$ is the torque applied by the second electrical machine MG2.

In normal operation, the speed of the cabin blower compressor 34 can be varied relative to the speed of the gas turbine 110 by addition or subtraction of speed at the first electrical machine MG1 with the second electrical machine MG2 supplying power to the first electrical machine MG1 or consuming power generated by the first electrical machine MG1 depending on whether the first electrical machine MG1 is generating (when subtracting speed) or motoring (when adding speed).

In detail, electrical power can be transferred through the electrical transmission 48 between the first and second electrical machines MG1, MG2, depending on whether the first electrical machine MG1 and the second electrical machine MG2 act as a generator or as a motor. For example, the power management system 46 may control the second electrical machine MG2 to act as a generator and feed back power to the first electrical machine MG1 through the electrical transmission 48.

For normal operation, where power from the gas turbine is used to drive the cabin blower compressor 34, efficiency will be maximised when the speed of the first electrical machine MG1, and hence power transferred through the electrical transmission 48, is minimised.

The cabin blower system 30 further includes a first one-way rotation device 62.

The first one-way rotation device 62 is arranged along the main transmission 50 and is configured to allow free rotation of the main transmission 50 in the forward direction and to prevent rotation of the main transmission 50 in a reverse direction opposite to the forward direction.

The first one-way rotation device 62 is arranged along the main transmission 50 between the gas turbine engine 110 and the summing gearbox 44, for example between the accessory gearbox 51 and the summing gearbox 44. In an embodiment, the first one-way rotation device 62 is arranged closer to the summing gearbox 44 than to the accessory gearbox 51, for example at the accessory gearbox.

The first one-way rotation device 62 may be a freewheel, utilising sprung pawls and a ratchet, or a sprag clutch, utilising friction between sprags and inner and out cylinders. It is preferable to arrange that centrifugal forces move the pawls or sprags into the unlocked position for normal operating speeds, as this reduces the wear on the device.

FIG. 4 illustrates the first one-way rotation device 62 according to a first embodiment.

In the FIG. 4 embodiment, the first one-way rotation device 62 is of the sprag clutch-type 60 and comprises an inner race 66, an outer race 68, and a plurality of sprags 67 and associated springs 69 circumferentially arranged therebetween (for sake of simplicity only some of the sprags 67 and associated springs 69 are illustrated). The spring 69 pushes the associated sprag 67 in abutment against the inner race 66.

The sprag 67 are substantially cam shaped wedges arranged at an angle with respect to the inner race 66 to allow free rotation of the inner race 66 with respect to the outer race 68 in one direction only. When torque is applied in opposite direction, friction between the sprags 67 and the inner race 66 (or the outer race 68, depending on the geometry of the first one-way rotation device 62) prevents rotation.

Various arrangements of the first one-way rotation device 62 can be implemented according to the disclosure with either the inner race 66 or the outer race 68 connected to, and thereby driven by, the main transmission 50. Furthermore, the sprags 67 and associated springs 69 may be integral with either the inner race 66 or the outer race 68.

The first one-way rotation device 62 is configured to allow rotation of the main transmission 50 in the forward direction F. When torque is applied in a reverse direction, opposite to the forward direction F, the first one-way rotation device is configured to prevent rotation of the main transmission 50 and, when preventing such rotation, applies a positive reaction torque on the summing gearbox 44.

In the embodiment illustrated in FIG. 4, the sprags 67 and associated springs 69 are integral with the outer race 68, which in turn is connected to the main transmission 50, such that in normal operation condition, i.e. when the main transmission 50 rotates in the forward direction F, centrifugal forces move the sprags 67 into an unlocked position, as this reduces the wear on the device.

In an alternative embodiment, the sprags 67 and associated springs 69 are integral with the inner race 66, which in turn are connected to the main transmission 50, such that in normal operation condition, i.e. when the main transmission 50 rotates in the forward direction F, centrifugal forces move the sprags 67 into an unlocked position, as this reduces the wear on the device.

FIG. 5 illustrates the first one-way rotation device 62 according to a second embodiment.

In the FIG. 5 embodiment, the first one-way rotation device 62 is of the ratchet and pawl-type 70 and comprises an inner race 71, an outer race 73, and a plurality of pawls 75 housed in the outer race 73. The inner race 71 features a radially external profile 76 shaped to present a plurality of teeth 77. The pawls 75 are pushed by springs 78 to follow the radially external profile 76 as the outer race 73 rotates in one direction relative to the inner race 71. When torque is applied in opposite direction, the pawls 75 drop between two adjacent teeth 77 preventing the outer race 73 from rotating relative to the inner race 71.

In the FIG. 5 embodiment, the outer race 73 is connected to the main transmission 50, such that as the main transmission 50 rotates in the forward direction, the outer race 73 rotates too. The inner race 71 is stationary and does not rotate along with the main transmission 50. As the main transmission 50 rotates in the forward direction, centrifugal force acts against the springs 78 allowing the pawls 75 not to contact the radially external profile 76 of the inner race 71, thereby reducing wear on the pawls 75 and the teeth 77 of the inner ring 71. In a reverse direction, opposite to the forward direction, the pawls 75 engage with the teeth 77 locking the main transmission 50.

During normal operation, where the gas turbine engine 110 drives the cabin blower system 30 through the main transmission 50, the first one-way rotation device 62 allows the main transmission 50 to freely rotate and substantially performs no function. The one-way rotation device 62 is advantageous in the case where it is desired to operate the cabin blower compressor 34 from the aircraft's electrical power without running the gas turbine engine 110. Running the cabin blower compressor 34 from electrical power potentially reduces local emissions at airports when the aircraft is parked and cabin air conditioning is required.

If the gas turbine engine 110 does not run, the torque $T_{GT}$ provided by the gas turbine engine 110 to the cabin bower system is zero. The advantage can be seen from considering the situation without the one-way rotation device 62. As $T_{LOAD}+T_{MG2}=0$, without the one-way rotation device 62, it is only possible to drive the cabin blower compressor 34 from the second electrical machine MG2. Thus the torque applied to the load is limited by the capability of the second electrical machine MG2. The torque at the gearbox and hence at the first electrical machine MG1 must be zero as, when inactive, the gas turbine engine 110 cannot exert any torque. Thus the first electrical machine MG1 cannot give any assistance.

When present, the one way rotation device 62 prevents reverse rotation of the main transmission 50 and therefore of the gas turbine engine 110 and applies a counter-torque on to the summing gearbox 44 with $\Omega_{GT}=0$ and a reverse torque applied. We can therefore use both the first electrical machine MG1 and the second electrical machine MG2 to drive the cabin blower compressor 34.

From equations 1) and 2) the following relationships apply:

$$-T_{LOAD} = T_{MG2} + \frac{T_{MG1}}{K_2},$$

and $$-P_{LOAD} = P_{MG2} + P_{MG1}.$$

The counter torque provided by the one-way rotation device is $$T_{GT} = \frac{K_1}{K_2} T_{MG1}.$$

Figure 6:
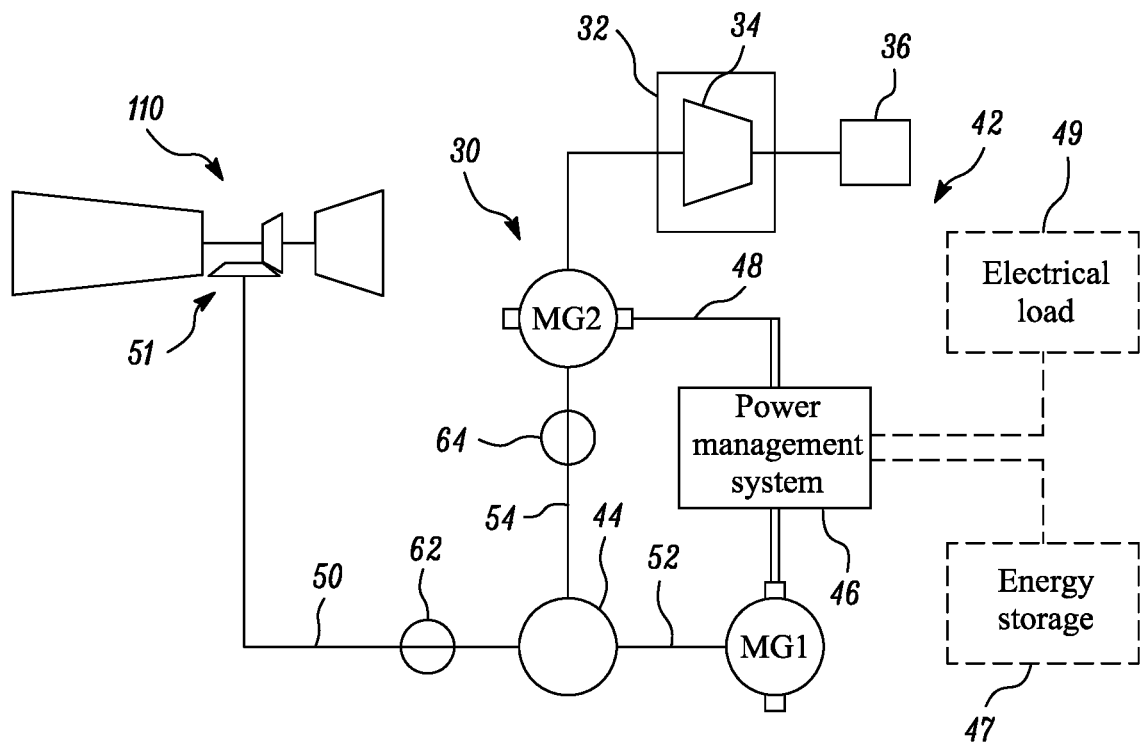
FIG. 6 is a block diagram of a cabin blower system comprising two one-way rotation devices.

FIG. 6 illustrates a second embodiment of cabin blower system 300 for an aircraft according to the disclosure. The cabin blower system 300 of the second embodiment is substantially similar to the cabin blower 30 of the first embodiment illustrated in FIG. 3 and differs from it only for the presence of a second one-way rotation device 64 arranged along the second auxiliary transmission 54. Like features between FIGS. 3 and 6 are given like reference numerals, and will not be described again in relation to FIG. 6.

The second one-way rotation device 64 is configured to allow free rotation of the second auxiliary transmission 54 in the forward direction and to prevent rotation of the second auxiliary transmission 54 in a reverse direction opposite to the forward direction.

The second one-way rotation device 64 may be a freewheel, utilising sprung pawls and a ratchet, or a sprag clutch, utilising friction between sprags and inner and out cylinders, of the type illustrated with reference to FIGS. 4 and 5, and therefore the second one-way rotation device 64 will not be described again in relation to FIG. 6.

The second one-way rotation device 64 is advantageous to start the gas turbine engine 110 using the cabin blower 32, therefore removing the need for a separate starter motor and reducing the weight and complexity of the powerplant.

To drive the gas turbine engine 110 to start it, rotation of the main transmission 50 must be in the forward direction. Power is flowing to the gas turbine engine 110 so the sign of the power flow is negative. We therefore see that torque must be negative. The first one-way rotation device 62 permits this rotation and torque transmission because it only resists reverse rotation of the main transmission 50.

An electrically powered start may be achieved using power supplied from the aircraft electrical network. The ultimate source of the power may be on-board battery storage, another on board electrical generation device or externally connected power.

A method of starting the gas turbine engine 110 is proposed where first electrical machine MG1 provides the motive power. The second one-way rotation device 64 prevents reverse rotation of the cabin blower compressor 34 and the second electrical machine MG2 and provides a countertorque such that the first electrical machine MG1 can be used to start the gas turbine engine 110 by motoring in reverse.

From equations 1) and 2), the following relationships apply:

$$\Omega_{GT} = -\frac{K_2}{K_1}\Omega_{MG1},$$

and $$T_{GT} = \frac{K_1}{K_2}T_{MG1}.$$

Motoring in reverse, $T_{MG1}$ and $\Omega_{MG1}$ are both negative. Being driven in the forward direction, until self-sustaining, $\Omega_{GT}$ is positive and $T_{GT}$ is negative.

The second one-way rotation device 64 is optional as there are other ways of achieving a start without the second one-way rotation device 64 being present.

For example, an electric start could be achieved by driving both the first electric machine MG1 and the second electric machine MG2. The second electric machine MG2 would be driven to a low speed, to provide the necessary counter torque without wasting energy by spinning the cabin blower compressor 34 at excessive speeds.

In the embodiments of FIGS. 3 and 6, two elements are sometimes shown on the same shaft: the first electrical machine MG1 and the gas turbine engine 110, and the second electrical machine MG2 and the cabin blower compressor 34. In fact they may be connected by numerous methods, of which co-axial mounting on the same shaft is only one. For the principal of operation to hold the speed of the two items must be in fixed proportion, and there are many ways to achieve this. The electrical machines (MG1 and MG2) could be geared to the shaft through another item. For example, the second electrical machine MG2 may be geared to a shaft connecting the summing gearbox output to the blower compressor, or a secondary gearbox may split the summing gearbox output to two shafts connected to the second electrical machine MG2 and the cabin blower compressor respectively. The gearing could be a spur gear, allowing the motor/generator axis of the electrical machines to be offset from and parallel to the shaft; a bevel gear, allowing the motor/generator axis to be offset and at an angle to the shaft; or an epicyclic gear train, allowing the motor/generator axis to be co-axial with the shaft but with a speed difference. Alternatively, the electrical machine could be connected to the shaft by a chain drive. A combination of elements such as these could be used to find a solution that provides the drive ratios that best match the ideal speeds of the first and second electrical machines MG1, MG2, the gas turbine engine 110 and cabin blower compressor 34, and the packaging requirements of the overall cabin blower system 30, 300 and gas turbine engine 110.

In embodiments, the summing gearbox 44 may be an epicyclic gearbox, or a differential gear, similar to those used in the automotive industry. An epicyclic gearbox may have the advantage over a differential gear of offering a higher power capability for a given gearbox weight.

Figure 7:
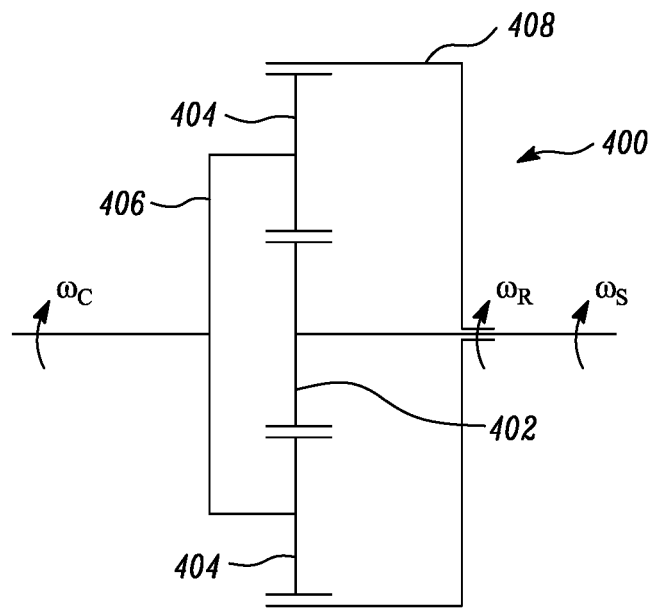
FIG. 7 is a schematic view of a planetary gearbox.

FIG. 7 illustrates an epicyclic gearbox 400 that may be used as summing gearbox.

The epicyclic gearbox 400 comprises a sun gear 402, a plurality of planet gears 404, a carrier 406 and a ring gear 408. Radially outwardly of the sun gear 402 and intermeshing therewith is the plurality of planet gears 404 that are coupled together by the carrier 406. The planet carrier 406 constrains the planet gears 404 to precess around the sun gear 402 in synchronicity whilst enabling each planet gear 404 to rotate about its own axis. Radially outwardly of the planet gears 404 and intermeshing therewith is the ring gear 408.

Taking NR, Ns as the number of teeth on the ring gear 408 and sun gear 402 respectively, it can be shown that $$\omega_R = \left(\frac{Ns}{N_R}+1\right)\omega_C - \frac{Ns}{N_R}\omega_S, \qquad 3)$$

where $\omega_R$ is the rotational speed of the ring gear 408, $\omega_C$ is the rotational speed of the carrier, 406, and $\omega_S$ is the rotational speed of the sun gear 402.

Equation 3) takes the general form of equation 1) above for a summing gearbox, for example, designating $$\Omega_{out}=\omega_r;\ \Omega_1=\omega_C;\ \omega_2=\omega_S,$$

we find $$K_1 = \left(\frac{Ns}{N_R}+1\right);\ K_2 = \frac{Ns}{N_R}.$$

The designation of which arm of the epicyclic gearbox is the summing output is a design choice and values of K1 and K2 can equally be found if the carrier 406 or the sun gear 402 is defined as the summing output.

Figure 8:
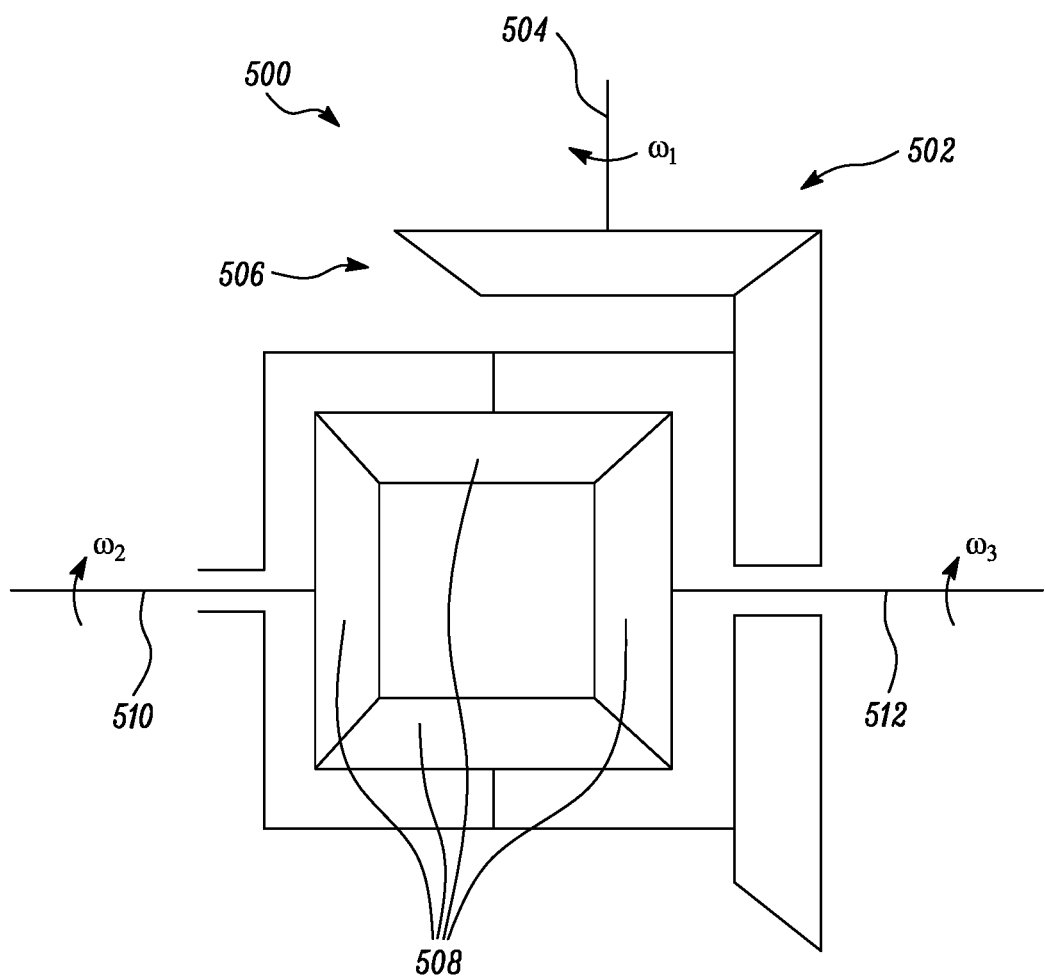
FIG. 8 is a schematic view of a differential gear.

FIG. 8 illustrates a differential gear 500 that may be used as summing gearbox.

The differential gear 500 comprises a cage, or casing, 502 geared to a shaft 504 which rotates with speed w) by a bevel gear set 506. The differential gear has a reduction ratio R such that the rotation speed of the cage 502 is $\omega_1/R$. Within the cage 502, four meshing bevel gears 508, each of identical size, connect shafts 510, 512 that rotate at speeds $\omega_2$ and $\omega_3$, respectively.

Starting with the special case $\omega_1=0$, we can see by inspection that:

$$\omega'_2=-\omega'_3$$

Where $\omega'_2$, and $\omega'_3$ correspond to $\omega_2$ and $\omega_3$ in such special case. Expand to the general case by superposing the cage rotation.

$$\omega_2=\omega'_2+\omega_1/R \Rightarrow \omega'_2=\omega_2-\omega_1/R$$

$$\omega_3=\omega'_3+\omega_1/R=-\omega'_2+\omega_1/R=-(\omega_2-\omega_1/R)+\omega_1/R=2\omega_1/R-\omega_2$$

$$\omega_1=R/2(\omega_2+\omega_3)$$

So we can see that the differential can act as a summing gearbox. Designating $$\Omega_{load}=\omega_1;\ \Omega_1=\omega_2;\ \Omega_2=\omega_3,\text{ we find } K_1=K_2=R/2.$$

Again, we could define one of the other shafts to be the output and find alternate values for $K_1$ and $K_2$.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An aircraft cabin blower system comprising:
   a cabin blower including a compressor configured to provide air to a cabin of the aircraft;
   a variable drive system configured to drive the compressor and including an electric variator and a summing gearbox, wherein the electric variator comprises a first electrical machine, a second electrical machine, and a power management system, the first and the second electrical machines being independently configured to work as electric motors and/or as power generators; and
   a main transmission configured, when operating in a blower mode, to receive mechanical power from a main gas turbine engine and input mechanical power to the summing gearbox in a forward direction; and configured, when operating in a starter mode, to receive mechanical power from the summing gearbox and input mechanical power to the main gas turbine engine;
   wherein the aircraft cabin blower system further includes a first one-way rotation device adapted to permit free rotation of the main transmission in the forward direction and to prevent rotation of the main transmission in a reverse direction opposite to the forward direction;
   wherein the first electrical machine is connected to the summing gearbox through a first auxiliary transmission, and the second electrical machine is connected to the summing gearbox through a second auxiliary transmission; and
   further comprising a second one-way rotation device adapted to permit free rotation of the second auxiliary transmission in the forward direction and to prevent rotation of the second auxiliary transmission in the reverse direction opposite to the forward direction.

2. The aircraft cabin blower system of claim 1, wherein the second electric machine is connected to the compressor of the cabin blower.

3. The aircraft cabin blower system of claim 1, wherein the first electrical machine and the second electrical machine are connected to the power management system.

4. The aircraft cabin blower system of claim 1, wherein the second one-way rotation device includes a freewheel with a ratchet device comprising sprung pawls, or a sprag clutch.

5. The aircraft cabin blower system of claim 4, wherein the second one-way rotation device is arranged such that centrifugal forces move the sprung pawls or sprags into an unlocked position when the main transmission rotates in the forward direction.

6. The aircraft cabin blower system of claim 1, wherein the first one-way rotation device includes a freewheel with a ratchet device comprising sprung pawls, or a sprag clutch.

7. The aircraft cabin blower system of claim 6, wherein the first one-way rotation device is arranged such that centrifugal forces move the sprung pawls or sprags into an unlocked position when the main transmission rotates in the forward direction.

8. The aircraft cabin blower system of any one of claim 1, wherein the summing gearbox is an epicyclic gearbox, or a differential gear.

9. A gas turbine engine comprising the cabin blower system of claim 1.

10. An aircraft comprising the cabin blower system of claim 1.

11. Use of the aircraft cabin blower system of claim 1, to drive the cabin blower purely electrically by means of the electric variator without running the gas turbine engine.

12. Use of the aircraft cabin blower system of claim 1, to start the gas turbine engine purely electrically by means of the electric variator without running the gas turbine engine.

* * * * *